(No Model.)

T. CÔTÉ.
TOBACCO CUTTER.

No. 433,768. Patented Aug. 5, 1890.

WITNESSES.
R. Matte.
Rt. Leclaire.

INVENTOR.
Théophile Côté
By J. Coursolle,
Atty.

UNITED STATES PATENT OFFICE.

THÉOPHILE CÔTÉ, OF LEVIS, QUEBEC, CANADA.

TOBACCO-CUTTER.

SPECIFICATION forming part of Letters Patent No. 433,768, dated August 5, 1890.

Application filed November 22, 1889. Serial No. 331,189. (No model.)

*To all whom it may concern:*

Be it known that I, THÉOPHILE CÔTÉ, a citizen of Canada, residing in the city and county of Levis, in the Province of Quebec, Canada, have invented certain new and useful Improvements in Tobacco-Cutters; and I do hereby declare the following to be a full, clear, and exact description of the invention, such as will enable others skilled in the art to which it appertains to make and use the same.

My invention relates to improvements in portable or pocket tobacco-cutters, and has for its object the providing of a machine for the purpose mentioned that may be folded up when not in use into such compact form that it may be carried without inconvenience in a pocket, and that will hold a sufficient quantity of cut tobacco for immediate use at any time.

With this object in view, I have constructed my tobacco-cutter mainly in the form of a cylindrical shell having one open and one partly closed end. In this shell there is placed a cylindrical cutter made preferably of sheet steel and having obliquely-slotted mouths and cutting-edges. A stem is formed on or attached to the inner end of this cutter, and projects through and is journaled in the partly closed end of the shell, outside of which it is squared to receive a crank or handle by which the cutter is rotated within the shell. This handle is made up of three sections, which are jointed together and arranged to fold over a mouth-piece which is fixed on the outer surface of the shell and to cover the open end of the shell, all as hereinafter described in detail, reference being had to the accompanying drawings, in which—

Figure 1:
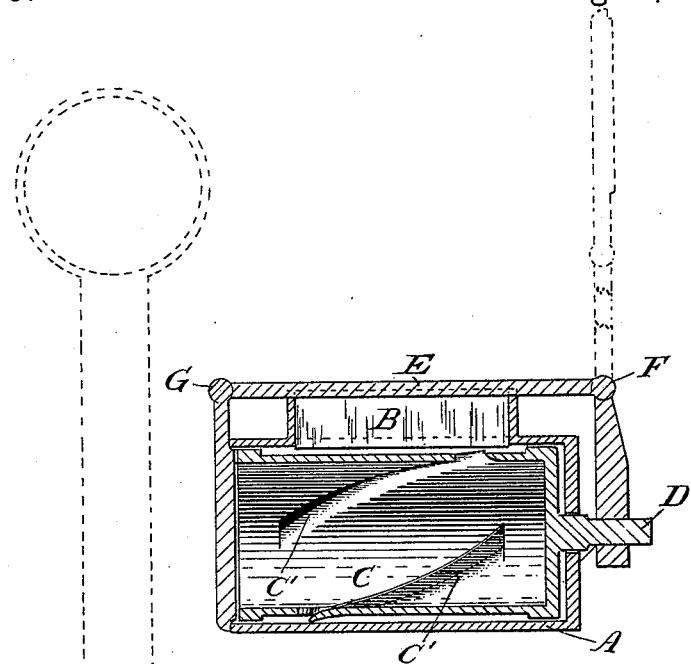
Figure 2:
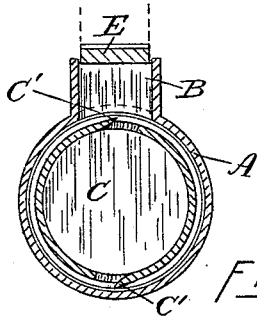
Figure 3:
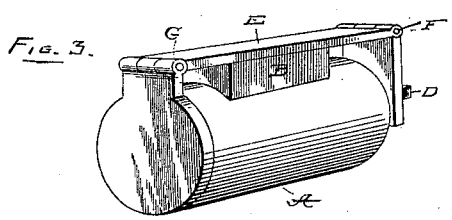

Figure 1 is a longitudinal section, and Fig. 2 a transverse section, of my improved tobacco-cutter. Fig. 3 is a perspective view of my tobacco-cutter with the handle folded.

The cylindrical shell A is made of sheet metal, and has an elongated rectangular opening cut in it. Around the edges of this opening there is erected an inclosure or mouth-piece B, which may be made of any suitable depth. The cutter C is also a cylindrical shell having one or more mouths or openings cut in it obliquely from one end to the other, one edge C' of each opening being slightly raised and brought to a sharp cutting-edge. The inner end of the cutter is closed by a head-piece, on which is formed a stem D, which is journaled in the head of the shell A, and carries on its protruding end the handle E, which has in it the joints F and G, which allow it to be folded over the mouth-piece B when not employed in cutting. The outer section of the handle is then folded over the open end of the shell, its size and circular shape adapting it to fit accurately on the end of the shell.

In working this cutter the handle is first opened out, as indicated by dotted lines, Fig. 1. The tobacco to be cut is then placed in the mouth-piece B and held against the cutter, which is then rotated by the handle E, causing the edges of the cutter to shave the tobacco, which then drops inside the cutter.

What I claim as my invention in this tobacco-cutter is—

1. In a tobacco-cutter, the combination of the open-ended inclosing shell, the open-ended rotary cutting-cylinder mounted therein, the operating-handle applied to one end of the said cylinder, and a removable cover applied to the opposite end of the device, whereby it is rendered portable and is adapted for the storage of cut tobacco, which may be removed at will.

2. In a tobacco-cutter, the combination of the open-ended inclosing-shell, the rotary cutter mounted therein and provided with the spindle extending through the shell, and the jointed operating-handle applied to the spindle and arranged to be folded over the open end of the shell, as described.

3. In a tobacco-cutter, the hollow cylindrical shell A, having the mouth-piece B, and the hollow cylindrical cutter C journaled in it, and provided with the jointed handle E, arranged to fold over the mouth-piece B and over the end of the shell A, substantially as herein shown and described.

THÉOPHILE CÔTÉ.

Witnesses:
 ART. LECLAIRE,
 R. MATTE.